Oct. 5, 1965
T. R. BROGAN
3,210,576
MAGNETOHYDRODYNAMIC APPARATUS FOR
GENERATING ELECTRICAL ENERGY
Filed Feb. 2, 1961
4 Sheets-Sheet 1
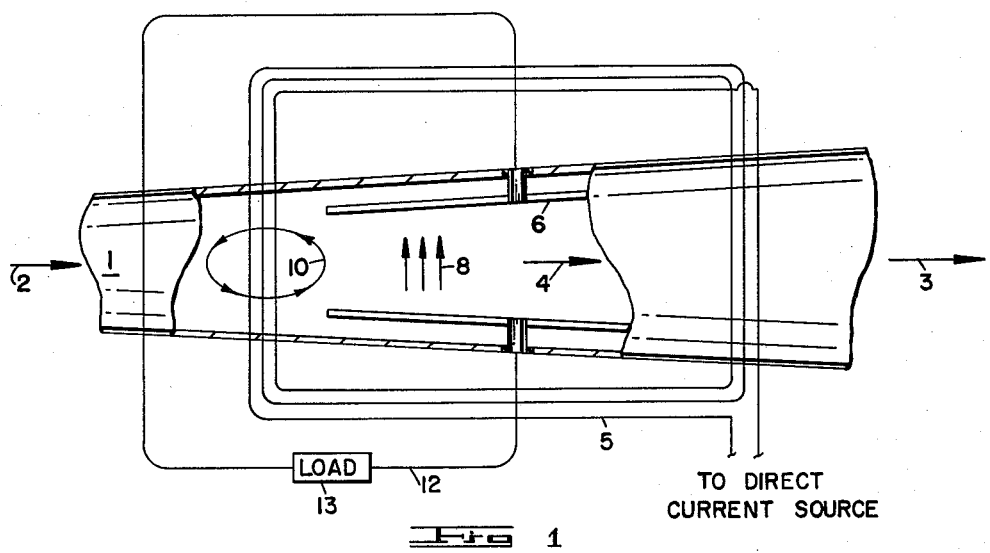
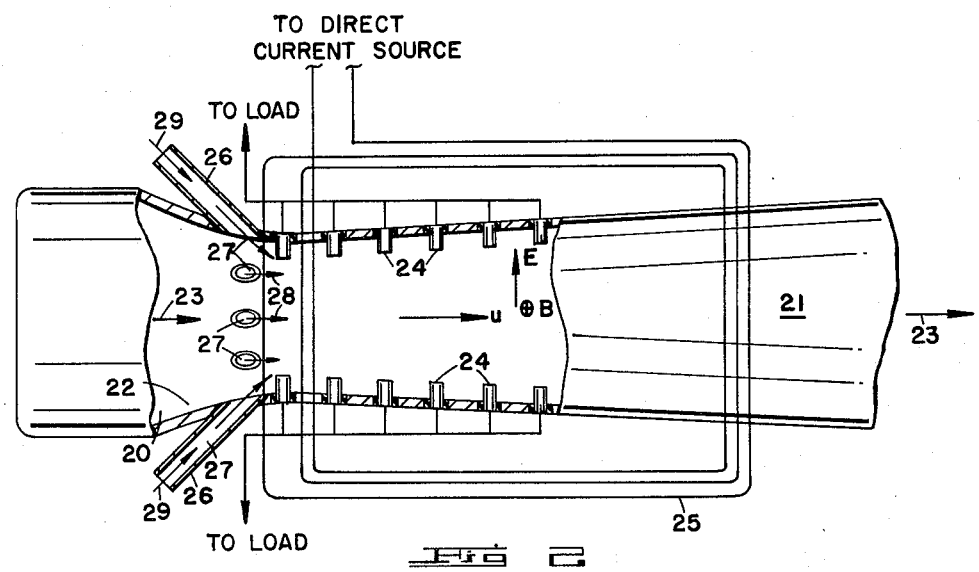
THOMAS R. BROGAN
*INVENTOR.*
BY Alden D. Redfield
Melvin E. Frederick
ATTORNEYS

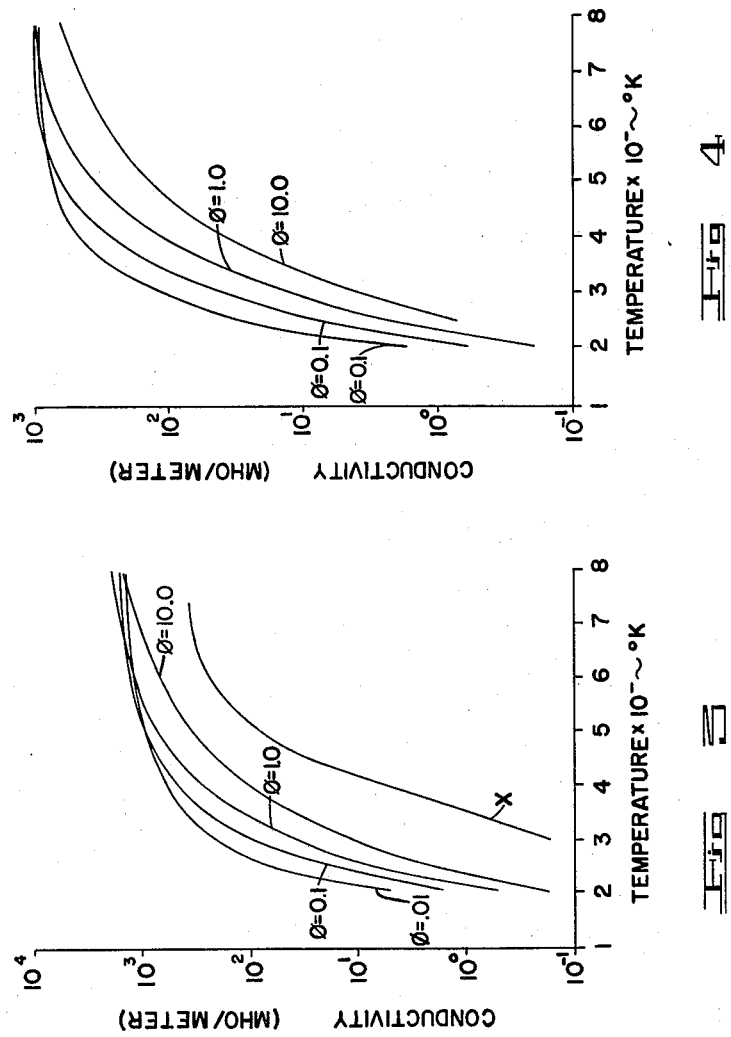

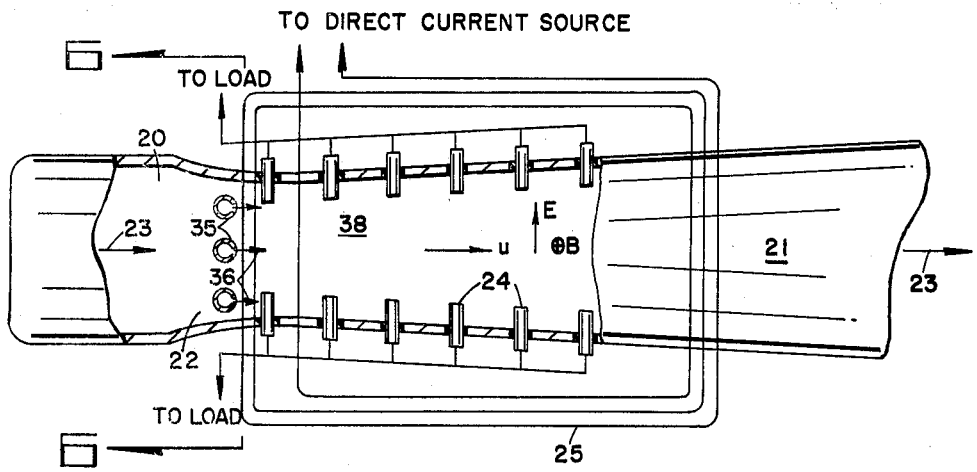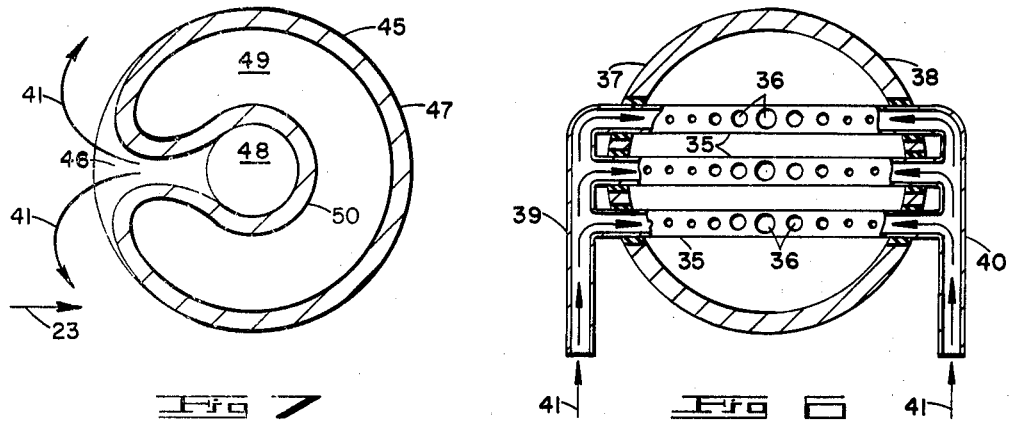

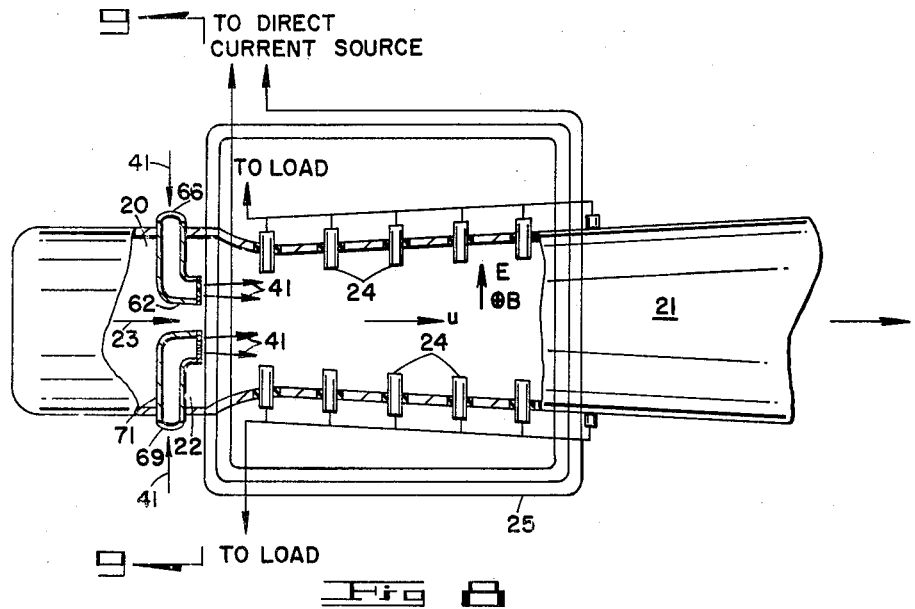
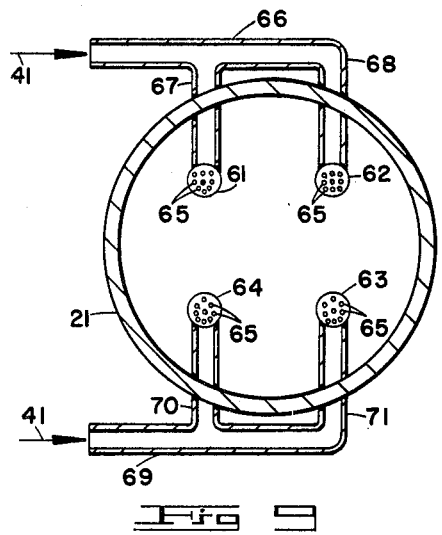
THOMAS R. BROGAN
INVENTOR.
BY Alden D. Redfield
Melvin E. Frederick
ATTORNEYS _United States Patent Office_

3,210,576
Patented Oct. 5, 1965

3,210,576
MAGNETOHYDRODYNAMIC APPARATUS FOR GENERATING ELECTRICAL ENERGY
Thomas R. Brogan, Arlington, Mass., assignor to Avco Corporation, Cincinnati, Ohio, a corporation of Delaware
Filed Feb. 2, 1961, Ser. No. 86,628
1 Claim. (Cl. 310—11)

The present invention relates to magnetohydrodynamic apparatus for generating electric energy and, more particularly, to improved apparatus for transforming the kinetic energy of an electrically conductive stream of fluid into electric energy.

In general terms, magnetohydrodynamic (hereinafter abbreviated MHD) generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes with the generator. The gas may exhaust to a sink, which may simply be the atmosphere; or, in more sophisticated systems, a recovery system including pumping means for returning the gas to the source.

Several different gases may be used; the gas may simply be air, combustion products, or may comprise inert gases, such as helium or argon. In open systems, i.e., those in which the gases are not recovered after passing through the power plant, air or combustion products are normally used. In closed systems, in which the gases are recovered and recirculated, it is feasible to use relatively expensive gases, such as helium and argon. To promote electrical conductivity, the gases are heated to high temperature and practical conductivity is achieved by the addition to the gases of a substance that ionizes readily at the operating temperature. Regardless of the gas used, in the working section of the generator it comprises a mixture of electrons, positive ions and neutral atoms which, for convenience, may be termed "plasma."

According to a well-known law in physics, the movement of an electrically conductive substance through a magnetic field induces an electromotive force at the edges of the substance which may be used to force an electric current through a work circuit.

When the substance is of an area greater than that of the magnetic field, the part of the material extending beyond the magnetic field will permit the flow of eddy currents and may form a short circuit with respect to the electromotive force. The short circuit and eddy currents do no contribute to the flow of useful current and, consequently, result in losses and a reduction in generator efficiency.

It will be obvious that the electrically conductive gas of an MHD generator and the electrically conductive fluid in the case of electromagnetic pumps extend beyond the magnetic field associated therewith and that losses therein will occur. Such losses may be due, for example, to eddy currents. The reduction of such losses is most desirable and efforts have, therefore, been made to reduce these losses. In the case of MHD generators, Patent No. 957,242, issued to J. E. Noeggerath, May 10, 1910, Patent No. 1,196,511, issued to H. E. Borger, August 29, 1916, and Patent No. 1,916,076, issued to E. Rupp, June 27, 1933, are exemplary of the three basic and previously known approaches to reduction of the short circuiting effect present in such devices.

Briefly, the Noeggerath patent which illustrates the first approach contemplates variation in the cross section of the duct and also in the field strength whereby a comparatively high electromotive force is induced in the electrically conductive fluid at the central portion of the duct, while gradually decreasing electromotive forces are induced toward the ends of the duct. By reason of this structure, it is stated that the distance from the point of maximum induced electromotive force to a point of zero electromotive force may be made so great that the short circuiting effect of the fluid used in the magnetic field is practically negligible.

The Borger patent, which illustrates the second approach, contemplates avoidance of the tendency of short circuiting through the conductive fluid or material within the duct by placing partitions or vanes of insulating material within the duct that extend consecutively through the fluid path adjacent the electrodes. It is stated that the vanes may extend some distance from the electrodes toward the inlet and outlet portions of the duct.

The Rupp patent, which illustrates the third approach, contemplates substantial elimination of the short circuiting effect by subdividing or interrupting the stream of electrically conductive fluid in the duct to form individual parts which are successively passed through the magnetic field.

Because, for example, of the present day use of a high pressure electrically conductive gas, the temperature of which may well be above 4000° F. for combustion products and perhaps 2800° F. for inert gases, and the high velocity of the gas, the aforementioned approaches represent at best only possible means for reducing the short circuiting effect that may well prove to be practically inoperative, and at worst means that have not attained substantial, if any, commercial application with all of the implications implicit therein.

In the case of electromagnetic pumps, the basic conception of utilizing partitions or vanes as taught by the Borger patent is practically exemplified, at least on a small scale, in Patent No. 2,558,698, issued to E. J. Wade, June 26, 1951.

In patent application Serial No. 86,818, filed February 2, 1961, to which reference is made, I disclose improved means for reducing, if not eliminating, short circuit end effects downstream of the electrodes. While I conceived the invention disclosed in the aforementioned patent application and the present invention simultaneously, the present invention is directed to the reduction of short circuit end effects upstream of the electrodes and is not applicable per se to the reduction of such effects downstream of the electrodes.

The present invention is based on the realization that the most practical fluid for use in an MHD generator is comprised of the products of combustion or substantially inert gases inherently at or heated to high temperatures to promote electrical conductivity; that even though such gases may be at extremely high temperatures, it may still be considered practically nonconductive; and that it must be seeded with a substance that ionizes readily at the operating temperature, such as, for example, a potassium salt or metal vapor, to achieve practical values of conductivity.

Thus, the objectives of the present invention are achieved by and reside in selective seeding of the fluid to be employed in an MHD generator by injection of the seed into the fluid at a point upstream of the beginning of the electrodes a distance sufficient to insure substantial mixing of the seed with the fluid to form the plasma but insufficient to permit the flow of appreciable eddy currents. By way of definition, the term "plasma" is used herein to designate the fluid after it has been seeded to provide practical values of conductivity, and the term "gas" is used to designate the fluid before it is seeded.

In view of the foregoing, it will be apparent that it is an object of the present invention to improve the efficiency of MHD generators by reducing losses therein due to eddy currents in the plasma.

Another object of the present invention is the provision of improved apparatus for more efficiently transforming the kinetic energy of an electrically conductive gas into electric energy.

Another object of the present invention is the reduction of short circuit end effects upstream of the electrodes in an MHD generator.

The novel features that are considered characteristic of the present invention are set forth in the appended claims; the invention itself, however, both as to its organization and method of operation, together with additional objects and advantages thereof, will best be understood from the following description of specific embodiments when read in conjunction wtih the accompanying drawings, in which:

FIGURE 1 is a diagrammatic illustration of an MHD generator;

FIGURE 2 is a diagrammatic illustration partly in section of an MHD generator incorporating the present invention;

FIGURES 3 and 4 are graphs illustrating the relation of electrical conductivity of gases to temperatures at various densities;

FIGURE 5 is a diagrammatic illustration of another embodiment of the present invention utilizing tubes for selectively seeding the fluid to be used in an MHD generator;

FIGURE 6 is a cross sectional view taken along lines 6—6 of FIGURE 5;

FIGURE 7 is a sectional side view illustrating a double wall tube adapted to be cooled for injecting seed into an MHD generator duct;

FIGURE 8 is a diagrammatic illustration partly in section of an embodiment of the present invention wherein injection head means are used to inject the seed into an MHD generator duct; and FIGURE 9 is a cross sectional view taken along line 9—9 of FIGURE 8.

A knowledge of the general principles of MHD generators will promote an understanding of the present invention. For this reason, there is shown in FIGURE 1 a schematic diagram of an MHD generator. As illustrated in that figure, the generator comprises a duct, generally tapered and designated by the numeral 1, to which high temperature, high pressure, electrically conductive plasma is introduced as from a combustion chamber (not shown) as indicated by the arrow at 2, and from which it exhausts, as indicated by the arrow at 3. The pressure at the exit of the duct is lower than at its inlet; and for this reason the plasma moves at high velocity through the duct, as indicated by the arrow at 4. By properly choosing the pressure differential and shape of the duct, the plasma can be made to move through the duct at substantially constant velocity, which is desirable, although not necessary, to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct perpendicular to the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a unidirectional electromotive force between the electrodes, as indicated by the arrows at 8. The gradient of the magnetic field upstream of the electrodes 6 and 7 sets up eddy currents as indicated by the arrow 10. Eddy currents are also set up downstream of the electrodes 6 and 7. However, the present invention is not directed to reduction of these downstream eddy currents.

The electrodes 6 and 7 are connected by conductors 11 and 12 to a load 13 through which electrical current flows under the influence of the electromotive force induced between the electrodes.

From the foregoing description, it will be immediately recognized that an MHD generator of the type described employs a stationary magnetic field and unidirectional gas flow. As a result, such a generator is inherently a source of direct current. If alternating current is desired, specially designed generators or auxiliary equipment must be provided to invert the direct current to alternating current. Further, such a generator is inherently subject to eddy current losses upstream of the electrodes.

With reference now to FIGURE 2, there is shown diagrammatically a combustion chamber 20 communicating with divergent duct 21 composed of a suitable nonconductive material. High temperature, high pressure gas introduced into the inlet 22 of the duct 21 as indicated by the arrow 23 flows at high velocity through the duct as indicated by the arrow $u$, and is exhausted from the outlet of the duct as indicated by the arrow 23. Oppositely disposed segmented electrodes 24 are provided within the duct 21. The duct 21 is surrounded by a continuous electrical conductor in the form of a coil 25 to which direct current is supplied from a conventional source (not shown). Flow of electrical current through the coil 25 establishes a magnetic flux through the duct as indicated by the arrow B. Since the oppositely disposed electrodes 24 are shown in FIGURE 2 as being parallel to the plane of the paper, the magnetic flux is perpendicular to the direction of plasma flow and the plane of the paper. The electrodes 24 preferably extend along the length of the duct from a point a short distance downstream from about the effective beginning of the magnetic field adjacent the inlet end of the duct to a point a short distance upstream from the effective end of the magnetic field adjacent the outlet end of the duct. The effective beginning and the effective end of the magnetic field may be considered to be at respectively about the upstream and downstream end of the conductor forming the magnetic coil 25. Pipes 26 spaced around and opening into the inlet 22 of the duct through generally circular exhaust ports 27 are located at about the upstream terminal point of the electrodes 24 to permit the injection into the duct of seed indicated generally by the arrows 28. The pipes 26 are mounted at an acute angle with respect to the outer surface of the duct to facilitate injection of the seed into the duct.

Even though the gas may be at temperatures of the order of 4000° F. or higher for combustion products and perhaps 2800° F. for inert gases, it is still essentially nonconductive for practical purposes, at least so far as short circuit end effects are concerned. Thus, injection of seed, which is to say a substance that ionizes readily at the inlet temperature, is necessary to achieve practical values of conductivity.

The electrical conductivity of a gas is fundamentally related to its thermal ionization. Since the degree of thermal ionization is a steep function of gas temperature, there is a limiting temperature below which requisite ionization cannot be achieved. Even if an easily ionizable substance is added to the gas, this low temperature limit is approximately 4000° F. for combustion products or similar gases. For inert gases used in closed cycles, the lower operating limit is approximately 2800° F. This will be understood when it is realized that thermal ionization is very much like molecular dissociation and has the same kind of dependence upon temperature. In the same way that the temperature at which a molecule dissociates depends upon the value of its "dissociation energy," the temperature at which an atom or molecule ionizes depends upon its "ionization energy." Most common gases, such as air, carbon monoxide, carbon dioxide or the noble gases, have a relatively high ionization energy and, hence, do not ionize until quite high temperatures are reached. However, if a small amount (0.1 to 3.0) of some easily ionizable material, such as alkali metal vapor, is added to the gas, a practically useful degree of ionization can be attained at a much lower temperature.

Shown in FIGURE 3 is a graph illustrating conductivity in mhos/meter v. temperature in degrees Kelvin for gases including 1% potassium. Designated by $\phi$ is the gas density in atmospheres for each curve. The graph of FIGURE 3 is drawn for gases having an electron molecular cross section of $10^{-15}$ cm.$^2$. In FIGURE 4 are illustrated a similar family of curves for gases with 1% potassium in which the electron molecular cross section is $3 \times 10^{-15}$ cm.$^2$.

These curves illustrate that gas conductivity is steeply dependent upon gas temperature. Although the electron molecular cross section depends upon the particular gas used, a typical average value of combustion gases useful in MHD generators is approximately $1.5 \times 10^{-15}$ cm.$^2$. Thus, as illustrated by these curves, within the range of practical working fluids, even those including an additive, temperatures in excess of about 2600° K. are necessary if high gas conductivity is to be attained.

Included in FIGURE 3 is a curve, designated X, showing the electrical conductivity of air without additives. A study of this curve will reveal that the conductivity of air is very low at temperatures below 3000° K. This illustrates several important points. First, that it is desirable to use a high temperature gas; second, that the gas must be seeded with an additive to provide practical values of conductivity; and, third, that for practical operating temperatures the gas has a low value of conductivity prior to being seeded.

Returning now to FIGURE 2, the seed which may be suspended in a suitable carrier is supplied to the pipes 26 from a source (not shown) as indicated by the arrows 29. As indicated previously, the seed may be a metal vapor, solid, or salt, suspended in a carrier.

It is to be noted, however, that the present invention is not limited in the particular kind of seed disclosed nor is it necessary that the seed be injected at a point immediately upstream of the electrodes. Further, the carrier may be at elevated temperatures whether it is combustible or not.

Most of the upstream eddy current losses will occur within one duct diameter upstream from the first electrode. Thus, although it is preferable that the seed be introduced as close to the first upstream electrode as possible, commensurate with satisfactory dispersion and ionization of the seed, satisfactory results will be obtained if the seed is introduced at a distance upstream from the first electrodes not in excess of about one duct diameter at the first electrode. The furthermost downstream point of injection should not be closer to the first upstream electrode than about one-fourth of the diameter of the duct at the first upstream electrode in order to permit substantial dispersion and ionization of the seed. For optimum operation the effective beginning of the magnetic field should correspond with about the point at which the seed is injected. However, as used in the claims, "the upstream terminal point of said electrodes," is to be considered as including the portion of the duct located between about the first electrode in an upstream direction and the effective beginning of the magnetic field.

If the effective beginning of the magnetic field extends upstream past the first electrode, this will tend to produce a back electromotive force which opposes the end effect eddy currents. In this case, the seed may be injected upstream of the electrodes but within the magnetic field and within a duct diameter at the first electrode.

Since extension of the effective beginning of the magnetic field tends to produce a back electromotive force which opposes the end effect eddy currents, it might be concluded that a sufficient extension of the magnetic field in the upstream direction comprises a simple and efficient solution to the problem. However, as with all matters of this nature, a price so to speak must be paid to achieve reduction of upstream eddy currents in this manner and this price makes the desirability of this solution illusory.

In fact, extension of the effective begining of the magnetic field in the upstream direction is subject to many serious disadvantages. The most important of these disadvantages results from the fact that in order to extend the magnetic field the duct generally will have to be elongated, and elongation of the duct over that otherwise required results in an additional inactive duct region and hence greater heat transfer losses. Also, the velocity of the gas must be kept high in this region thus imposing additional and difficult combustion and flow problems. Further, the size of the magnet must obviously be increased over that otherwise required. Thus, it may now be readily seen that although a modest extension of the magnetic field in the upstream direction might be beneficial for certain generator designs, complete solution of the problem of upstream eddy current losses in this manner is not desirable. By way of explanation, a modest extension would be a distance that is small as compared to the diameter of the duct at the first electrodes.

The injection of seed into the duct in the manner described in connection with FIGURE 2 to reduce the short circuit end effects upstream of the first electrode for a distance of the order of the inlet duct diameter, while effective, does not provide the most effective dispersion of seed in the gas. It would be highly desirable if distribution of the seed could be improved without a disproportionate, or any, increase in upstream short circuit end effects over that otherwise possible. Obviously, if better distribution of the seed is achieved, more efficient operation of the generator will be obtained.

FIGURE 5 shows an arrangement for providing a more effective distribution of the seed in the gas than that obtainable by the embodiment illustrated in FIGURE 2.

With reference now to FIGURE 5 and FIGURE 6, there is shown a duct, electrodes and coil similar to that shown in FIGURE 2. As shown in FIGURE 5 and FIGURE 6 by way of example and not of limitation, three hollow tubes 35 are provided extending across the duct inlet 22 and upstream of the electrodes 24. The tubes 35 may be made of a material having low electrical conductivity, are provided with exhaust ports 36 on their downstream side, and pass through opposite sides 37 and 38 of the duct for connection to respectively inlet headers 39 and 40.

In order to prevent undue restriction of the inlet, the total cross sectional area of the tubes 35 should be as small as practically possible. By way of example, but not of limitation, the total cross sectional area of the injection means, such as, for example, tubes 35, may be about 2% of the cross sectional area of the duct inlet. The tubes 35 in FIGURE 5 and FIGURE 6 are shown on an enlarged scale to facilitate illustration of the invention.

As best shown in FIGURE 6, the seed from a source (not shown) is supplied under pressure as indicated by the arrows 41 to the headers 39 and 40 and thence to both ends of the tubes 35 and thereafter injected into the duct through exhaust ports 36 in tubes 35. The exhaust ports 36 are of conventional configuration to provide an even supply of seed along the length of each tube. Also, the exhaust ports 36 may be located on the upstream side of the tubes 35 if desired. Location of the exhaust ports on the upstream side of the tubes may result, for example, in increased heating of the tubes where a combustible carrier for the seed is used, but has the important advantage of increased diffusion of the seed into the gas.

As the seed from each tube travels downstream it mixes with the gas to form the plasma. The number of tubes, their spacing, the exhaust ports, total cross sectional area, and the volume of seed injected into the duct are chosen on the basis of calculations and experience to balance economic factors and electrical efficiency. The exhaust ports in the tubes may take several forms. For example, where the seed is introduced at both ends of the tubes as indicated by the arrows 41 in FIGURE 6 the exhaust ports may extend over the length of the tubes and increase in diameter toward the center of the duct as shown in FIGURE 6 to provide an even flow of seed along the length of each tube. Alternately, if the seed is supplied to only one end of the tubes, passages or an exhaust port may be provided that increase in a direction perpendicular to the longitudinal axis of the tubes from one side of the duct to the other side of the duct where the tubes are terminated. Further, if desired, the tubes may have an aerodynamic configuration to reduce stresses on them.

FIGURE 7 shows a double wall tube adapted to be cooled for injecting seed into the generator duct. As shown in this figure, the double wall tube 45 is provided with exhaust ports 46 on the upstream side so that the seed indicated by the arrows 41 is caused to pass back over the outer wall 47 of the tube by the gas indicated by the arrow 23. The seed is introduced under pressure into the center portion 48 of the tube and is injected into the duct through the exhaust ports 46. A coolant to maintain the tube at a safe temperature is passed through the outer portion 49 which is separated from the inner portion 48 by the inner wall 50.

A modification of the embodiment illustrated in FIGURE 5 is shown in FIGURE 8 and FIGURE 9. As shown in these figures, the seed indicated by the arrows 41 is injected into the duct 21 from a plurality of injection heads 61, 62, 63, and 64. Each injection head is provided with exhaust ports 65. Seed in a liquid, combustible carrier may be supplied to the injection heads 61 and 62 via header 66 and pipes 67 and 68, and to injection heads 63 and 64 via header 69 and pipes 70 and 71. Injection heads 61-64 are of conventional design and function in the same manner as shower heads to inject the seed and carrier into the duct in the form of divergent sprays which cover substantially the entire inlet area of the duct. Since the carrier and seed is injected into the gas in the form of a relatively fine spray, it will be appreciated that complete combustion of the carrier and hence ionization of the seed is effected over substantially the entire area of the duct inlet at the most advantageous location as described hereinbefore.

The injection heads are symmetrically spaced within the duct inlet to insure optimum dispersion of the seed. Although four injection heads are shown, it is to be understood that a greater or lesser number may be used. Irrespective of the number of injection heads used, and as was pointed out in connection with the embodiment illustrated in FIGURE 5, the total cross sectional area of the injection heads and pipes should be as small as practically possible. If a single injection head is used, it obviously should be located on the longitudinal axis of the duct.

The embodiment illustrated in FIGURE 8 and FIGURE 9 while having certain advantages over the previously described embodiments functions in substantially the same manner as that described in connection with FIGURE 5 to reduce or eliminate upstream end effect short circuits. The embodiment illustrated in FIGURE 8 and FIGURE 9 finds its greatest advantage in the reduction of structure within the duct inlet and improved dispersion of the seed.

The various features and advantages of the invention are thought to be clear from the foregoing description. Other features and advantages not specifically enumerated will undoubtedly occur to those versed in the art as likewise will many other variations and modifications of the embodiments of the invention illustrated, all of which may be achieved without departing from the spirit and scope of the invention as defined by the following claim:

I claim:

In a magnetohydrodynamic generator, apparatus for reducing short circuit end effects adjacent the upstream terminal point of oppositely disposed electrodes located within a duct for conveying through a magnetic field at an angle to said electrodes a plasma comprised of a gas having a relatively low conductivity and an ionized substance to increase the conductivity of said gas to a practical value, comprising: at least one hollow tube extending through and secured to opposite sides of said duct upstream of said electrodes a distance that is small relative to the diameter of the duct at said upstream terminal point, said tube having exhaust ports on its upstream side communicating with the interior of the duct for substantially dispersing said substance in said gas; and means for injecting said ionized substance in a combustible carrier into said duct through said exhaust ports whereby the conductivity of said gas is increased to a practical value at about the upstream end of said electrodes.

References Cited by the Examiner

UNITED STATES PATENTS

| | | | |
|---|---|---|---|
| 1,717,413 | 6/29 | Rudenberg | 310—11 X |
| 2,210,918 | 8/40 | Karlovitz | 310—11 |
| 2,754,442 | 7/56 | Boutry | 313—63 |
| 3,154,703 | 10/64 | Zahavi | 310—11 |

OTHER REFERENCES

Publication: "Fundamental Processes of Electrical Discharge in Gases," by Loeb, John Wiley and Sons (1947), pages 374 to 377, inclusive.

Publication: "MHD Generation using Nuclear Fuel by AVCO," Everett Research Laboratory, Everett, Mass., March 1960, pages 6 and 16.

Publication: "Magnetohydrodynamic Generators," by Way; Westinghouse Engineer, July 1960, pages 105 to 107.

ORIS L. RADER, *Primary Examiner.*

MILTON O. HIRSHFIELD, DAVID X. SLINEY,

*Examiners.*

UNITED STATES PATENT OFFICE
CERTIFICATE OF CORRECTION

Patent No. 3,210,576                            October 5, 1965

Thomas R. Brogan

It is hereby certified that error appears in the above numbered patent requiring correction and that the said Letters Patent should read as corrected below.

Column 5, line 5, for "3..0" read -- 3.0% --; line 21, for "of" read -- for --.

Signed and sealed this 27th day of September 1966.

(SEAL)
Attest:

ERNEST W. SWIDER                                  EDWARD J. BRENNER
Attesting Officer                                        Commissioner of Patents